United States Patent
Kemmler

(10) Patent No.: US 6,295,511 B1
(45) Date of Patent: Sep. 25, 2001

(54) APPARATUS FOR CONTROLLING AND MONITORING ACTUATORS WITH AN OPEN/CLOSE CHARACTERISTIC

(75) Inventor: Lothar Kemmler, Moerfelden-Walldorf (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 08/959,654

(22) Filed: Oct. 28, 1997

(30) Foreign Application Priority Data

Oct. 28, 1996 (DE) ................................. 196 44 801

(51) Int. Cl.[7] ............................................. G06F 11/30
(52) U.S. Cl. ............................ 702/188; 137/85; 137/82; 700/278
(58) Field of Search .............................. 702/188; 137/85, 137/82; 73/866.1; 700/9, 278, 276; 165/11.1; 340/825.06–825.08; 236/47, 49.3, 84

(56) References Cited

U.S. PATENT DOCUMENTS

| 4,942,613 | 7/1990 | Lynch | 165/11.1 |
|---|---|---|---|
| 5,148,000 * | 9/1992 | Tews | 219/125.11 |
| 5,194,790 | 3/1993 | Niimi | 318/567 |
| 5,699,824 * | 12/1997 | Kemmler et al. | 137/85 |

FOREIGN PATENT DOCUMENTS

| 39 27 973 | 2/1991 | (DE) . |
|---|---|---|
| 43 03 560 | 8/1994 | (DE) . |
| 44 41 620 | 5/1996 | (DE) . |

* cited by examiner

Primary Examiner—Kamini Shah
(74) Attorney, Agent, or Firm—Hill & Simpson

(57) ABSTRACT

An apparatus for controlling and monitoring actuators with an open/close characteristic consists of a first unit having a drive switch unit for operating a drive force unit, at least one limit signal generator that detects an end position of an actuator of the drive force unit and an electronic unit, such as a microprocessor, which first unit is connected to a second unit by a twin-core cable, and the second unit includes an apparatus for operating the drive switch unit and for outputting the state of the limit signal generator.

12 Claims, 1 Drawing Sheet

APPARATUS FOR CONTROLLING AND MONITORING ACTUATORS WITH AN OPEN/CLOSE CHARACTERISTIC

BACKGROUND OF THE INVENTION

The present invention is directed to an apparatus for controlling and monitoring actuators with an open/close characteristic, which apparatus consists of a drive switch unit for actuating a drive force unit, at least one limit or position signal generator that detects an end position of the actuator and an apparatus for actuating the drive switch unit as well as for outputting the limit signal generator state.

In the field of process automation, there are many developments that enable the realization of new possibilities for communicating with field apparatuses and, thus, of an improved controlling, savings of cost and fault monitoring. Thus, on the one hand, a quasi-analog method, already widely distributed, is given by the Highway Addressable Remote Transducer Field communication protocol or HART-field communication protocol, in which the digital signal with a mean value is superposed on a conventional analog signal. The apparatus operating according to the HART-field communications protocol can, without alteration, replace conventional processing apparatuses. On the other hand, great progress has been made in the use of purely digital process apparatuses that communicate with one another via a digital field bus. A digital field bus thereby enables, above all in a large processing installation, a considerable savings in the cost due to reduction in cabling expenses. However, it does have the disadvantage that convention analog apparatuses and field bus apparatuses cannot be exchanged with one another and the installation of the field bus system entails large investments and changes. Nonetheless, in particular for measuring transducers and controllers, such as, for example, position regulators on actuators, many field bus communication process apparatuses or HART-field communication process apparatuses are already available.

The preponderant number of actuators that are currently in use or will be used in the near future have an open/close characteristic, for which field bus communication process apparatuses or HART-field communication process apparatuses are however mostly too costly.

A large number of these controlling apparatuses with an open/close characteristic respectively operate with a drive switch unit for controlling a drive force unit and with at least one limit signal generator that detects an end position.

A typical apparatus for controlling and monitoring an actuator with an open/close characteristic according to the prior art is illustrated in FIG. 2. In these systems, an actuator drive unit (not shown), for example a pneumatic drive, is controlled by a drive switch unit in the form of a solenoid valve 9 and two limit signal generators 11 and 13. For the driving of the solenoid valve 9 and for the outputting of the limit signal generator states, specific apparatuses, such as a disconnecting or isolating amplifier 33 for the one limit signal generator 11, a control valve module 35 for the solenoid valve 9 and a disconnecting or isolating amplifier 37 for the other limit signal generators 13, are additionally provided and are respectively connected via separate cables 39, 41 and 43 with the limit signal generators 11 and 13 and with the solenoid valve 9, which are often arranged in an area in which there is a danger of explosion. The existence of the explosion-threatened area thereby militates against the integration into one unit of the apparatuses 33, 35 and 37 with the solenoid valve 9 and the limit signal generators 11 and 13. Thus, the known apparatuses for controlling and monitoring the actuators with an open/close characteristic are connected, in particular, with a high cabling expense.

SUMMARY OF THE INVENTION

The object of the present invention is to provide an apparatus in which the controlling and monitoring of actuators with an open/close characteristic so as to overcome the problems with the prior art, particularly to save costs, to provide greater ease of surveying and to reduce the susceptibility to failure.

To accomplish these goals, the present invention is solved in that a first unit comprises the drive switch unit, the limit signal generator and additionally comprises an electronics unit, while the second unit comprises the apparatus for driving the drive switch unit as well as for outputting states of the limit signal generator and the first unit is connected with the second unit by means of a twin-core cable.

It can thereby be provided that the twin-core cable transmits analog signals during operation.

The invention further proposes that the electronic unit of the first unit is connected with the twin-core cable. The electronic unit produces a corresponding control signal for the drive switch unit from the drive signal of the second unit, and the electronic unit changes a controllable current source or its interior resistance in dependence on the state of the limit signal generators.

It can also be provided, according to the invention, that the first unit is arranged in an explosion-threatened area, and that the second unit is arranged in a safe area.

An embodiment of the invention is characterized in that the switch signal for the drive switch unit consists of two voltage areas for two different switch positions of the drive force unit.

It is thereby preferred that the second unit detects the change in the current and converts it into a separate output signal for the state of the limit signal generators of the drive switch unit and into possible fault diagnostic messages.

Another embodiment of the invention is characterized in that the switch signal for the actuator drive unit consists of two current ranges for two different switch positions of the drive force unit.

It can thereby be provided that the second unit detects the change of voltage and converts it into a separate output signal for the state of the limit signal generator of the drive switch unit and into possible fault diagnostic messages.

According to the invention, it is preferred that the actuator drive unit is a solenoid valve and/or the drive force unit is a pneumatic drive.

The invention further proposes that the second unit integrates in itself the function of at least one disconnect amplifier and/or a valve control module.

In addition, it can be provided according to the invention that the electronics of the first unit contain a microprocessor.

The invention also proposes that the second unit contains a microprocessor.

In addition, it is provided that the method for fault monitoring can be executed and, preferably, fault messages can be outputted.

Other advantages and features of the invention will be readily apparent from the following description of the preferred embodiments, the drawings and claims.

DESCRIPTION OF THE PREFERRED EMBODIMENTS

Figure 1:
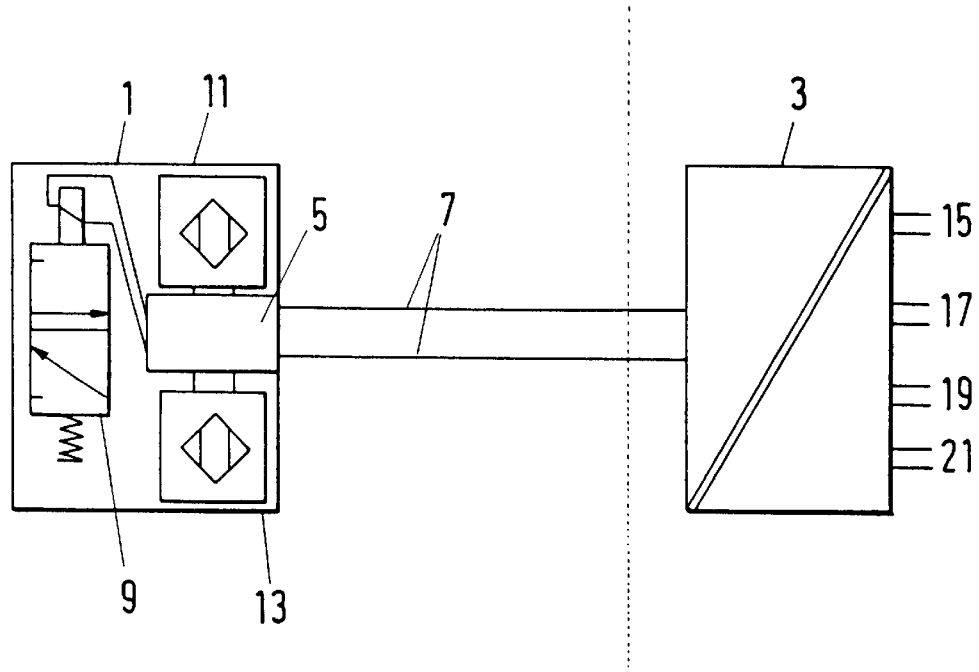
FIG. 1 is a schematic flow chart of a preferred embodiment of an apparatus for controlling and monitoring actuators with an open/close characteristic of the present invention.
Figure 2:
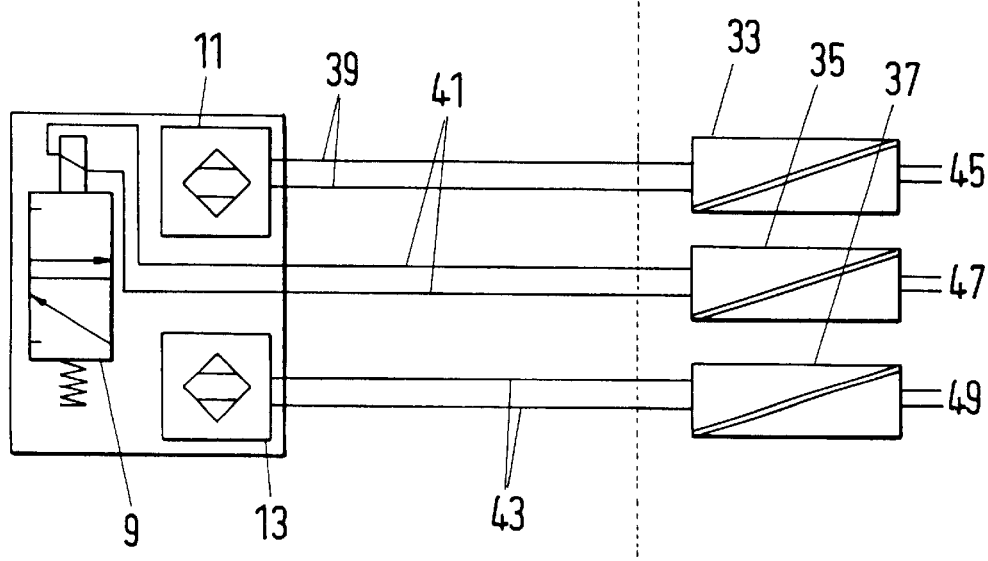
FIG. 2 is a flow chart corresponding to FIG. 1 of an apparatus according to the prior art.

The principles of the present invention are particularly useful when incorporated in an apparatus illustrated in FIG. 1 for controlling and monitoring actuators with an open/close characteristic consisting of a first unit 1 and a second unit 3. A drive switch unit 9 and two limit signal generators 11 and 13 are integrated in the first unit 1 together with an electronic unit 5 and are connected via exactly one twin-core cable 7 with a second unit 3 for actuating the drive switch unit 9 and receiving the states of the limit signal generators. In addition, the outputs of the second unit 3, for example the signal output 15 for the one limit signal generator 11, a signal output 17 for the other limit signal generator 13, a fault signal output 19 of the limit signal generators 11 and 13 as well as a drive switch unit 9 and a signal output 21 of the drive switch unit 9, are connected in a conventional way with a processing control apparatus, which is not shown.

During operation, the twin-core cable transmits analog signals, and does not have to comprise any characteristics that go beyond the requirements of standard analog cable.

The electronic unit 5 of the first unit 1 is connected with a twin-core cable 7 and forwards the switch signal outputted by the second unit 3 to the drive switch unit 9 and, dependent on the state of the limit signal generators 11 and 13, will alter either a controllable current source (not shown) or its internal resistance. The electronic unit 5 thereby combines in itself, in particular, capacities, such as, on the one hand, that of a twin-core measuring transformer, which changes, as a signal quantity, a controllable current source or the interior resistance, and, on the other hand, that of a position regulator which produces a corresponding control signal for the drive switch unit 9 from the drive signal, which, in this case, originates from the second unit 3.

In agreement with the embodiment of the invention shown in FIG. 1, it is advantageous to arrange the first unit 1 in an explosion-threatened area and the second unit 3 in a safe area.

According to the invention, the switch signal for the drive switch unit 9 can consist of two voltage ranges for two different switch positions of the drive force unit. It is therefore advantageously provided that the second unit 3 detects the change in current controlled by the first unit 1 and converts it into a separate output signal for the states of the limit signal generators 11 and 13 and of the drive switch unit 9 and also into possible fault diagnostic messages.

In an alternative embodiment of the invention, the switch signals of the drive switch unit 9 consist of two current ranges for two different switch positions. In this embodiment, it is advantageous if the second unit 3 detects a change of voltage controlled by the first unit 1 and converts it into output signals for the states of the limit signal generators 11 and 13 and of the drive switch unit 9 and into possible fault diagnostic messages.

In addition, it is preferred according to the invention:

to realize the drive switch unit as a solenoid valve 9 and the drive force unit (not shown) as a pneumatic drive;

to integrate the functions of the two disconnect amplifiers and a valve control module into a second unit 3;

to equip the electronic unit 5 of the first unit 1 with a microprocessor;

and/or to equip the second unit 3 with a microprocessor.

Independent of its arrangement, the microprocessors thereby enable the realization of the monitoring methods, such as are described, for example in copending U.S. patent application, Ser. No. 955,073, filed Oct. 21, 1997. Thus, this arrangement enables an intelligent fault monitoring with the use of conventional analog terminal equipment. The number of distinguishable faults is thereby not limited, since the analog coding of current or, respectively, voltage enables infinitely many states in principle.

The apparatus according to the present invention enables considerable simplification of the cabling and, thus, an increase in ease of surveying and in safety, with a simultaneous cost reduction. In particular, the installation expense is reduced for the connection of the cables to distribution boxes used multiply between the first unit 1 and the second unit 3 due to the reduction in the number of terminals.

In addition, the specific analog coding of the switch signal and the output signal can be freely selected independent of the invention and can, thus, be realized in a particularly simple manner corresponding to individual requirements.

Although various minor modifications may be suggested by those versed in the art, it should be understood that I wish to embody within the scope of the patent granted hereon all such modifications as reasonably and properly come within the scope of my contribution to the art.

I claim:

1. In an apparatus for controlling and monitoring actuators with an open/close characteristic, said apparatus comprising a drive switch unit for operating a drive force unit, at least one limit signal generator that detects an end position, and equipment for operating the drive switch unit and for outputting the limit signal generator states, the improvements comprising a first unit comprising the drive switch unit, the limit signal generator and, in addition, an electronic unit; and a second unit comprising an apparatus for providing a drive signal for the drive switch unit and for outputting the limit signal generator states and the electronic unit of said first unit being connected to the second unit by means of a twin-core cable, said twin-core cable transmitting analog signals during operation, the electronic unit of the first unit produces a corresponding control signal for the drive switch unit from the drive signal of the second unit received on the twin-core cable and the electronic unit changes a controllable current source or an interior resistance in dependence on the state of the limit signal generator.

2. In an apparatus according to claim 1, wherein the first unit is arranged in an explosion-threatened area and the second unit is disposed in a safe area away from the explosion-threatened area.

3. In an apparatus according to claim 1, wherein a switch signal for the drive switch unit consists of two voltage ranges for two different switch positions of the drive force unit.

4. In an apparatus according to claim 3, wherein the second unit detects a change in the current and converts it into separate output signals for the state of the limit signal generator and of the drive switch unit and into possible fault diagnostic messages.

5. In an apparatus according to claim 1, wherein a switch signal of the drive switch unit consists of two current ranges for two different switch positions of the drive force unit.

6. In an apparatus according to claim 5, wherein the second unit detects a change in the voltage and converts it into separate output signals for the state of the limit signal generator and of the drive switch unit and into possible fault diagnostic messages.

7. In an apparatus according to claim 1, wherein the drive switch unit is a solenoid valve and the drive force unit is a pneumatic drive.

8. In an apparatus according to claim 1, wherein the second unit integrates in itself the function of at least one disconnect amplifier and/or of a valve control module.

9. In an apparatus according to claim 1, wherein the electronic unit of the first unit contains a microprocessor.

10. In an apparatus according to claim 9, wherein the method for fault monitoring can be executed and preferably fault messages are outputted.

11. In an apparatus according to claim 1, wherein the second unit contains a microprocessor.

12. In an apparatus according to claim 11, wherein the method for fault monitoring can be executed and preferably fault messages can be outputted from said microprocessor of the second unit.

* * * * *